United States Patent
Chen

(10) Patent No.: US 8,412,954 B2
(45) Date of Patent: Apr. 2, 2013

(54) DATA ENCRYPTION DEVICE FOR STORAGE MEDIUM

(75) Inventor: Szu-Ming Chen, Hsinchu (TW)

(73) Assignee: Innostor Technology Corporation, Jhubei, Hsinchu County (TW)

( * ) Notice: Subject to any disclaimer, the term of this patent is extended or adjusted under 35 U.S.C. 154(b) by 378 days.

(21) Appl. No.: 12/800,613

(22) Filed: May 19, 2010

(65) Prior Publication Data

US 2011/0289325 A1 Nov. 24, 2011

(51) Int. Cl.
*G06F 21/00* (2006.01)

(52) U.S. Cl. ............ 713/189; 380/28; 380/278; 726/23; 726/29; 705/52

(58) Field of Classification Search .................. 713/189, 713/190
See application file for complete search history.

(56) References Cited

U.S. PATENT DOCUMENTS

| | | | | |
|---|---|---|---|---|
| 6,957,340 B1 * | 10/2005 | Pang et al. | ..................... | 713/189 |
| 2004/0015948 A1 * | 1/2004 | Sueyoshi et al. | ............. | 717/170 |
| 2004/0172538 A1 * | 9/2004 | Satoh et al. | .................... | 713/175 |
| 2006/0002548 A1 * | 1/2006 | Chu | ................................ | 380/28 |
| 2006/0265563 A1 * | 11/2006 | Goettfert et al. | ............... | 711/164 |
| 2007/0288922 A1 * | 12/2007 | Sueyoshi et al. | .............. | 718/100 |
| 2009/0319801 A1 * | 12/2009 | Aciicmez et al. | ............. | 713/189 |

* cited by examiner

*Primary Examiner* — Taghi Arani
*Assistant Examiner* — Mahfuzur Rahman
(74) *Attorney, Agent, or Firm* — Charles E. Baxley

(57) ABSTRACT

A data encryption device for storage medium has an encryption key input interface for acquiring a user encryption key; a block code encoder for encoding and decoding data; a scrambler connected with the encryption key input interface and the block code encoder to scramble and descramble data according to the user encryption keys respectively inputted; and a controller connected with the block code encoder and the scrambler, performing an encryption process transmit original data to the block code encoder for encoding, the encoded data to the scrambler for scrambling, and the scrambled data to a storage medium for storage, and performing a decryption process to transmit the scrambled data to the scrambler for descrambling, the encoded data to the block code encoder for decoding to acquire the original data when the user encryption keys respectively inputted in the encryption process and the decryption process are identical.

8 Claims, 4 Drawing Sheets

DATA ENCRYPTION DEVICE FOR STORAGE MEDIUM

BACKGROUND OF THE INVENTION

1. Field of the Invention

The present invention is related to a data encryption device for storage medium, and more particularly to a data encryption device for storage medium without a stored encryption key to prevent theft.

2. Description of the Related Art

Developments in semiconductors have increased higher storage capacity per unit volume so people can easily carry a storage medium with large storage capacity. However, due to loss or theft of the storage medium confidential information stored therein can be accessed by connection to a computer so risking undesired disclosure of sensitive information.

Therefore, two encryption methods for storage media are proposed.

1. Encryption key: An encryption key authentication procedure is stored in a storage medium. When the storage medium is connected with a computer for the first time, a user inputs a user encryption key using the computer and the user encryption key is stored in the storage medium. When the storage medium is connected with any computer, the user can only access data stored in the storage medium by inputting a code identical to the user encryption key stored in the storage medium.
2. Advanced Encryption Standard (AES): AES is a common encryption standard now. Every user is required to input an AES public key for encoding and a user authentication key for decoding. Original data are encrypted into encrypted data through an AES encryption and decryption software or hardware by using the AES public key and then are stored in a storage medium. The encrypted data must be decrypted through the AES encryption and decryption software or hardware by using the user authentication key to correctly access the original data.

However, regardless of whether data is secured using the user encryption key or AES, keys must be stored on the storage media so may be stolen with the storage media. Hence, conventional data encryption and decryption devices for storage media need to be refined.

SUMMARY OF THE INVENTION

An objective of the present invention is to provide a data encryption device for storage medium without a stored encryption key to prevent theft. To achieve the foregoing objective, the data encryption device for storage medium has an encryption key input interface, a block code encoder, a scrambler and a controller.

The encryption key input interface serves to input an encryption key.

The block code encoder serves to encode and decode data.

The scrambler is connected with the encryption key input interface and the block code encoder to scramble and descramble data according to the user encryption keys respectively inputted.

The controller is connected with the block code encoder and the scrambler and stores an encryption process and a decryption process. The encryption process is performed by the controller to acquire original data, transmit the original data to the block code encoder to encode the original data, transmit the encoded data to the scrambler to scramble the encoded data, and is adapted to transmit the scrambled data to a storage medium for storage.

The decryption process is performed by the controller to acquire the scrambled data from the storage medium, transmit the scrambled data to the scrambler to descramble the scrambled data, transmit the encoded data to the block code encoder to decode the encoded data, and acquire the original data when the user encryption keys respectively inputted in the encryption process and the decryption process are identical.

The data encryption device requires inputting a user encryption key each time when data are encrypted or decrypted. If the user encryption keys inputted during data encryption and decryption are the same, the scrambled data can then be recovered as original data. Otherwise, although the scrambled data can still be read without the user encryption key from a storage medium, the scrambled data are unreadable to the user. Therefore, the data encryption device can effectively encrypt data and the user encryption key is not stored in the data encryption device, thereby preventing the user encryption key stored in a storage medium from being stolen.

BRIEF DESCRIPTION OF THE DRAWINGS

FIG. 4A is an encoding transformation table stored in a block code encoder of the data encryption device in accordance with the present invention;

FIG. 4B is a decoding transformation table stored in the block code encoder of the data encryption device in accordance with the present invention.

DETAILED DESCRIPTION OF THE INVENTION

The present invention can be implemented in any type of storage medium, including a hard drive in a computer or a removable storage medium. The removable storage medium may be a flash drive. If the storage medium is the hard drive in the computer, it is a CPU in the computer exchanging data with the internal hard drive. If the storage medium is a removable storage medium, it is the computer exchanging data with the external removable storage medium.

Figure 1:
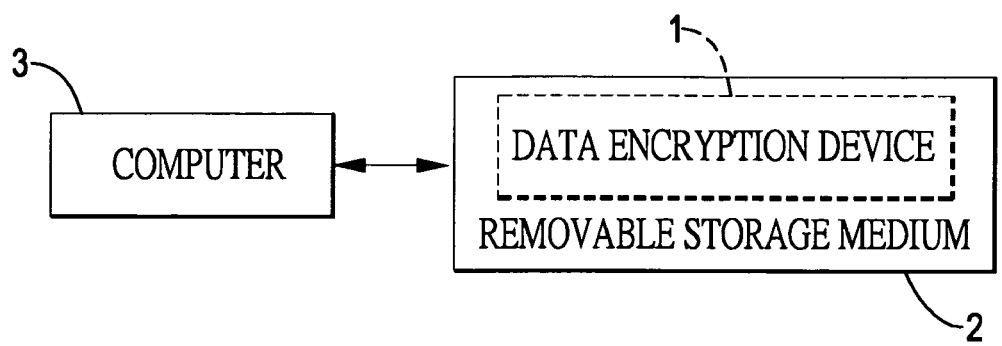
FIG. 1 is a block diagram of a data encryption device in accordance with the present invention mounted inside a removable storage medium connected with a computer.
Figure 2:
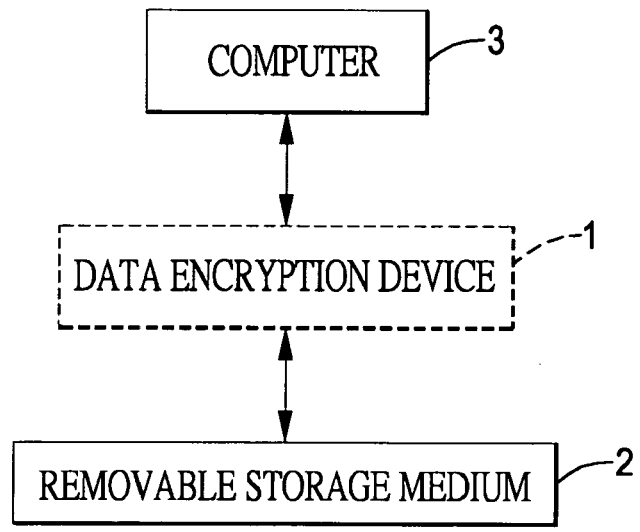
FIG. 2 is another block diagram of the data encryption device in accordance with the present invention externally connected between a computer and a removable storage medium.

With reference to FIG. 1, a data encryption device (1) in accordance with the present invention is implemented by software and is installed in a flash memory of the removable storage medium (2) to perform an encryption or decryption task when exchanging data with the computer (3). With reference to FIG. 2, the data encryption device (1) in accordance with the present invention is implemented by hardware and physically and electronically connected between the computer (3) and the removable storage medium (2) to perform data encryption and decryption.

Figure 3:
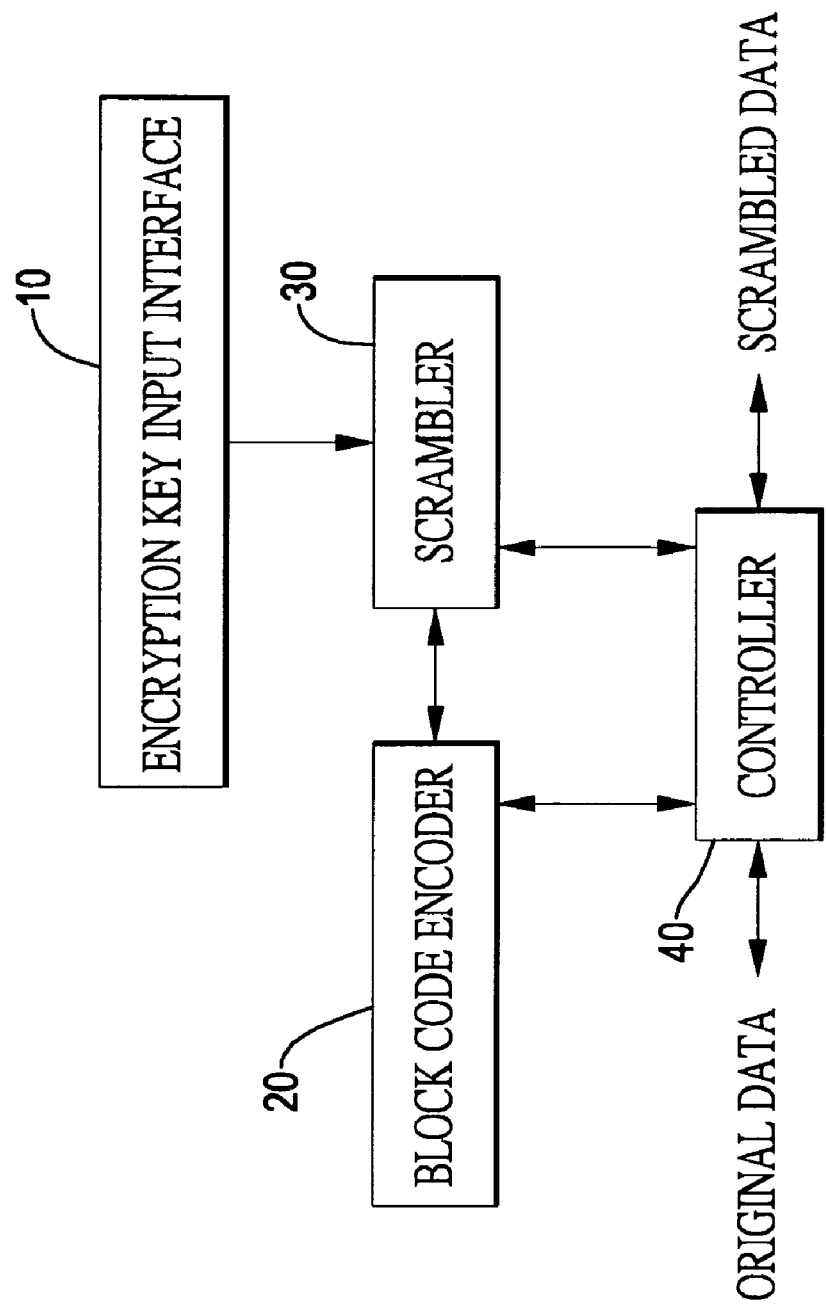
FIG. 3 is a block diagram of the data encryption device in accordance with the present invention.

With reference FIG. 3, the data encryption device (1) has an encryption key input interface (10), a block code encoder (20), a scrambler (30) and a controller (40).

The encryption key input interface (10) allows users to input a user encryption key. The encryption key input interface (10) may be a dialog box or a dialog window displayed on a screen of the computer connected with the storage medium for users to input the user encryption key through operation of the computer (3). In the preferred embodiment the user encryption key has 128 bits.

Figures 4A, 4B:
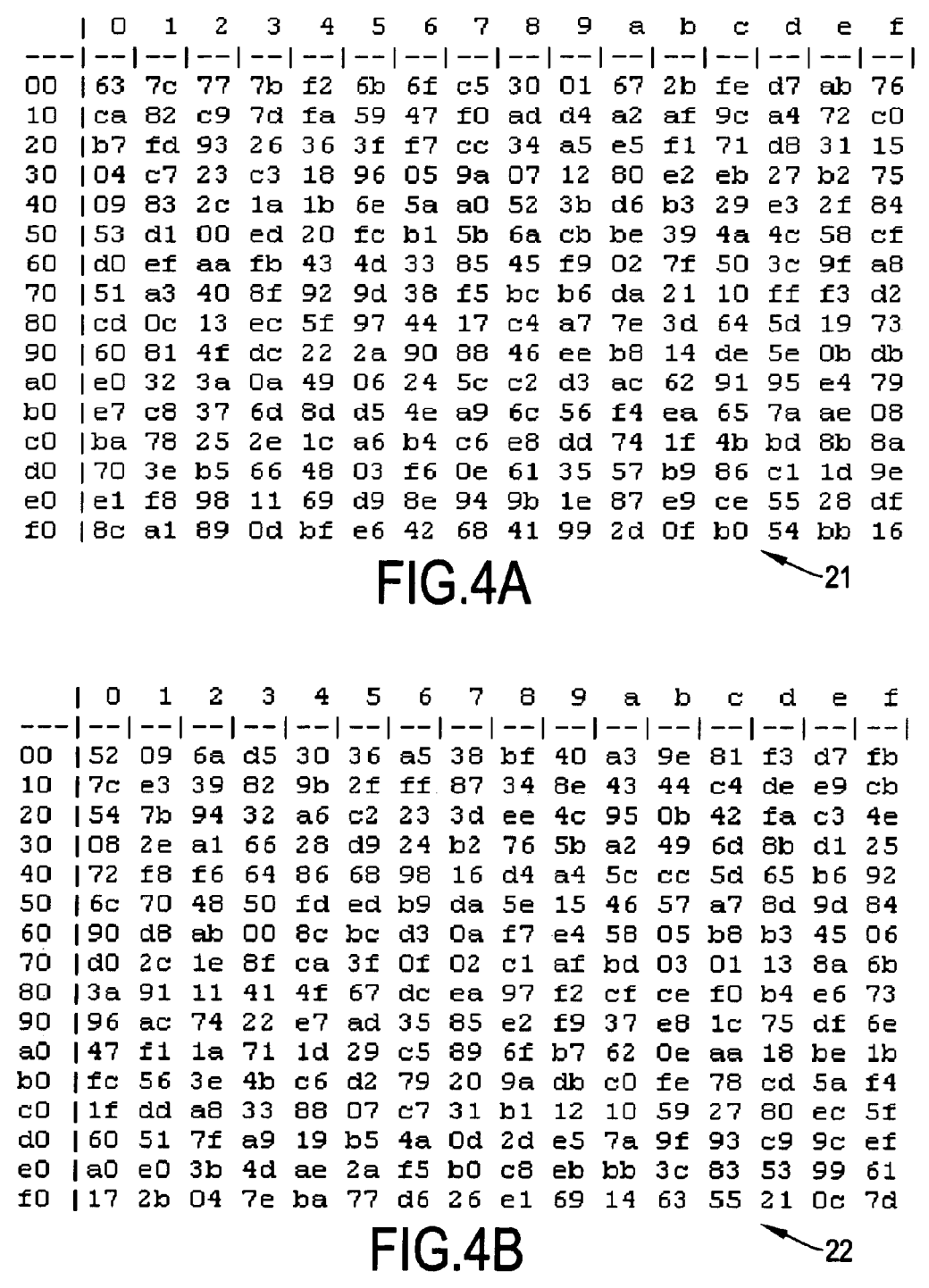

The block code encoder (20) serves to encode or decode data blocks. With reference to FIGS. 4A and 4B, the block code encoder (20) has an encoding transformation table (21) and a decoding transformation table (22). When encoding data, the block code encoder (20) first divides a data block to be encoded into multiple sub-data blocks, then sequentially encodes all sub-data blocks by using the encoding transformation table (21), and outputs the encoded sub-data blocks. For example, if a datum to be encoded is 0×ab, the encoded datum is 0×62. When the block code encoder (20) decodes data, a data block to be decoded is divided into multiple sub-data blocks, then sequentially decodes all sub-data blocks by using the decoding transformation table (22), and outputs the decoded sub-data blocks or the original sub-data blocks. For example, if an encoded datum is 0×62, the decoded datum is 0×ab.

Figure 5:
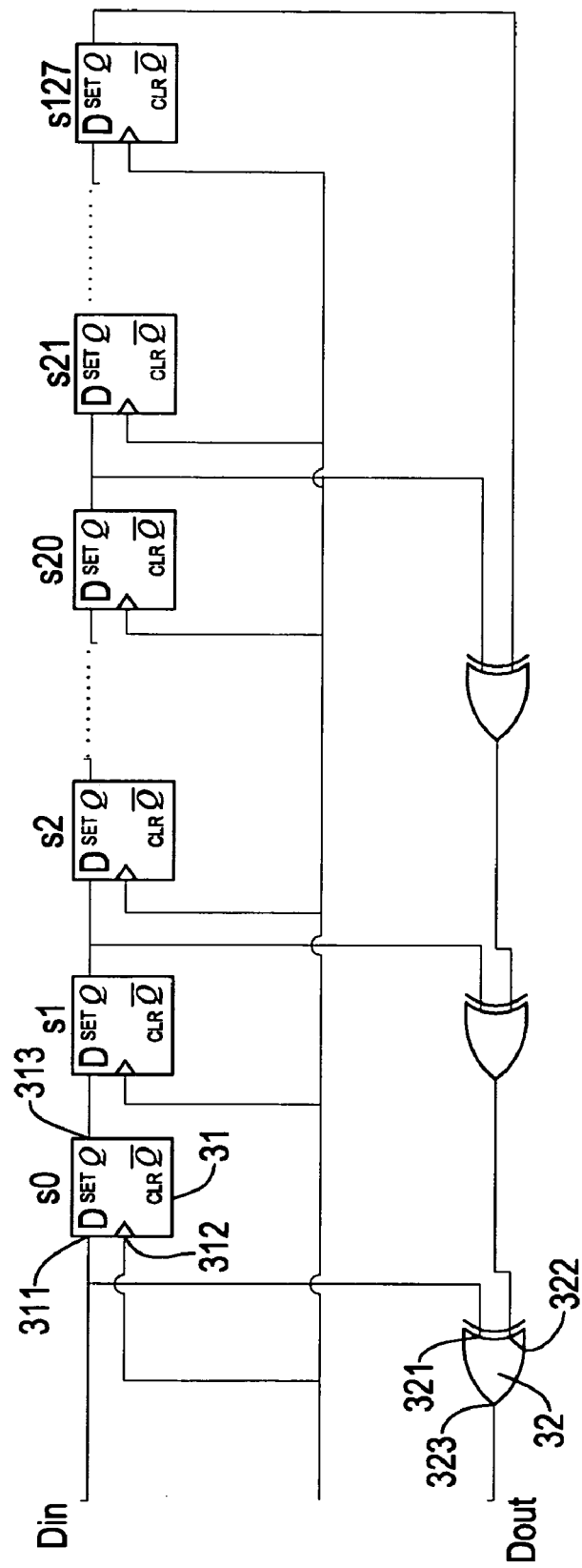
FIG. 5 is a circuit diagram of a scrambler of the data encryption device in accordance with the present invention.

The scrambler (30) is connected with the encryption key input interface (10) to perform bit stream scrambling or descrambling based on the user encryption key. With reference to FIG. 5, the scrambler (30) has n D flip-flops (31) and m exclusive OR (XOR) gates (32). The number 'n' corresponds to the data length or specifically the bit number of the user encryption key. Each D flip-flop has a D input terminal (311), a trigger input terminal (312) and a Q output terminal (313). The D input terminal (311) of the first D flip flop (31) is connected with the block code encoder (20) to acquire an encoded data block or scrambled data. The trigger input terminals (312) of all D flip flops (31) are connected with the encryption key input interface (10) to acquire corresponding bits of the user encryption key. The Q output terminal (313) of the first D flip flop (31) is connected with the D input terminal (311) of the second D flip flop (31). Similarly, the D input terminal (311) of the $n^{th}$ D flip flop (31) is connected with the Q output terminal (313) of the $(n-1)^{th}$ D flip flop (31). In the current embodiment, there are 128 D flip flops (31) to correspond to the data length of the user encryption key. Doing so can achieve $2^{128}$ types of combinations for scrambling, making it hard to be cracked using trial-and-error method.

The number 'm' is less than the number 'n'. Each XOR gate (32) has a first input terminal (321), a second input terminal (322) and an output terminal (323). The first input terminal (321) of each XOR gate (32) is connected with a D input terminal (311) of the corresponding D flip flop (31). The second input terminal (322) of the first XOR gate (32) is connected with the output terminal (323) of the second XOR gate (32). Similarly, the second input terminal (322) of the $m^{th}$ XOR gate (32) is connected with the Q output terminal (313) of the $n^{th}$ D flip flop (31). The output terminal (323) of the first XOR gate (32) serves to output scrambled data or descrambled data. The first input terminal (321) of the first XOR gate (32) is connected with the D input terminal (311) of the first D flip flop (31). The first input terminal (321) of the second XOR gate (32) is connected with the D input terminal (311) of the third D flip flop (31). The first input terminal (321) of the third XOR gate (32) is connected with the D input terminal (311) of the $20^{th}$ D flip flop (31). Consequently, the scrambler (30) can perform bit stream scrambling on a bitwise basis over encoded data blocks and bit stream descrambling on a bitwise basis over descrambled data.

The controller (40) is connected with the block code encoder (20) and the scrambler (30) and stores an encryption process and a decryption process. The encryption process is performed by the controller (40) when the controller (40) acquires original data from the computer (3), transmits the original data to the block code encoder (20) to encode the original data, transmits the encoded data to the scrambler (30) to scramble the encoded data, and transmits the scrambled data to a removable storage medium (2) for storage.

The decryption sequence is performed by the controller (40) when the controller (40) acquires scrambled data from the removable storage medium (2), transmits the scrambled data to the scrambler (30) to descramble the scrambled data, transmits the descrambled data to the block code encoder (20) to decode the descrambled data to acquire the original data. The decoded data can be processed correctly by the computer (3) only if the user encryption key acquired in the decryption process is identical to that acquired in the encryption process. Otherwise, the scrambler (30) fails to recover the decoded data to the original data. Even though the decoded data that are not recovered from the descrambling and decoding processes can still be read by the computer (3), the computer (3) may not be able to correctly read and display the data.

The data encryption device (1) of the present invention requires users to input a user encryption key upon encrypting or decrypting data. If the user encryption key inputted upon encryption differs from that inputted upon decryption, the scrambled data fail to be descrambled. As the data encryption device (1) of the present invention does not store the user encryption key in the storage medium and the user encryption key is scrambled in data instead, attaining that directly or intentionally cracking the data with the user encryption key requires an intense effort.

Because the block code encoder (20) requires two clocks only to complete data encryption or decryption by using the look-up tables and the scrambler (30) adds few more D flip flops (31) and XOR gates (32), a minor delay occurs upon encrypting and decrypting data while there is no increase of time clock. Accordingly, the data encryption device (1) of the present invention not only rapidly performs data encryption and decryption but also can be produced without requiring many components. So, the data encryption device (1) of the present invention addresses fast data encryption and decryption speed with no overall size increase.

Even though numerous characteristics and advantages of the present invention have been set forth in the foregoing description, together with details of the structure and function of the invention, the disclosure is illustrative only. Changes may be made in detail, especially in matters of shape, size, and arrangement of parts within the principles of the invention to the full extent indicated by the broad general meaning of the terms in which the appended claims are expressed.

What is claimed is:

1. A data encryption device for storage medium, comprising:
   an encryption key input interface serving to input a user encryption key;
   a block code encoder serving to encode and decode data;
   a scrambler connected with the encryption key input interface and the block code encoder to scramble and descramble data according to the user encryption keys respectively inputted, and having:
      n D flip flops, n corresponding to a data length of the user encryption key, and each D flip flop having:
         a D input terminal, the D input terminal of the first D flip flop connected with the block code encoder or receiving the scrambled data;

a trigger input terminal, the trigger input terminals of all D flip flops connected with the encryption key input interface to acquire the corresponding bits in the user encryption key; and a Q output terminal, the Q output terminal of the $i^{th}$ D flip flop connected with the D input terminal of the $(I+1)^{th}$ D flip flop when I=1 to n−1, and the Q output terminal of the $(n-1)^{th}$ D flip flop connected with the D input terminal of the $n^{th}$ flip flop; and m XOR gates, m being less than n, and each XOR gate having:
  a first input terminal connected with the D input terminal of the corresponding D flip flop;
  a second input terminal, the second input terminal of the $m^{th}$ XOR gate connected with the Q output terminal of the $n^{th}$ D flip flop; and
  an output terminal, the output terminal of the $(j+1)^{th}$ XOR gate connected with the second input terminal of the $j^{th}$ XOR gate when j=1 to m−1, and the output terminal of the first XOR gate serving to output the scrambled data or the descrambled data; and a controller connected with the block code encoder and the scrambler and storing:
  an encryption process performed by the controller to acquire original data, transmit the original data to the block code encoder to encode the original data, transmit the encoded data to the scrambler to scramble the encoded data, and adapted to transmit the scrambled data to a storage medium for storage; and
  a decryption process performed by the controller to acquire the scrambled data from the storage medium, transmit the scrambled data to the scrambler to descramble and scramble data, transmit the encoded data to the block code encoder to decode the encoded data, and acquire the original data when the user encryption keys respectively inputted in the encryption process and the decryption process are identical.

2. The data encryption device as claimed in claim 1, wherein
the user encryption key has 128 bits;
the scramble has:
  128 D flip flops; and
  3 XOR gates, the first input terminal of the first XOR gate connected with the D input terminal of the first D flip flop, the first input terminal of the second XOR gate connected with the D input terminal of the third D flip flop, the first input terminal of the third XOR gate connected with the D input terminal of the $20^{th}$ D flip flop.

3. The data encryption device as claimed in claim 1, wherein the block code encoder stores:
  an encoding transformation table used by the block code encoder when the block code encoder receives the original data, divides the original data into multiple sub-data blocks, sequentially encodes the sub-data blocks with the encoding transformation table, and outputs the encoded sub-data blocks to the scrambler; and
  a decoding transformation table used by the block code encoder when the block code encoder receives the encoded data, divides the encoded data into multiple sub-data blocks, and sequentially decodes the sub-data blocks with the decoding transformation table to acquire the original data.

4. The data encryption device as claimed in claim 2, wherein the block code encoder stores:
  an encoding transformation table used by the block code encoder when the block code encoder receives the original data, divides the original data into multiple sub-data blocks, sequentially encodes the sub-data blocks with the encoding transformation table, and outputs the encoded sub-data blocks to the scrambler; and
  a decoding transformation table used by the block code encoder when the block code encoder receives the encoded data, divides the encoded data into multiple sub-data blocks, and sequentially decodes the sub-data blocks with the decoding transformation table to acquire the original data.

5. The data encryption device as claimed in claim 1 implemented as hardware and adapted to physically and electronically connect with a computer and a removable storage medium.

6. The data encryption device as claimed in claim 2 implemented as hardware and adapted to physically and electronically connect with a computer and a removable storage medium.

7. The data encryption device as claimed in claim 3 implemented as hardware and adapted to physically and electronically connect with a computer and a removable storage medium.

8. The data encryption device as claimed in claim 4 implemented as hardware and adapted to physically and electronically connect with a computer and a removable storage medium.

* * * * *